United States Patent Office 3,535,092
Patented Oct. 20, 1970

3,535,092
REDUCTION OF HALOGEN-CONTAINING
SILICON COMPOUNDS
Alan J. Chalk, Scotia, N.Y., assignor to General Electric
Company, a corporation of New York
No Drawing. Filed June 14, 1968, Ser. No. 736,991
Int. Cl. C01b 23/04; C07f 7/02, 7/08
U.S. Cl. 23—366
13 Claims

ABSTRACT OF THE DISCLOSURE

Halogen-containing silicon compounds can be reduced with sodium hydride at temperatures lower than has previously been possible by effecting the reduction reaction in the presence of an aprotic solvent selected from the class consisting of hexaalkylphosphoramides, octaalkylpyrophosphoramides, tetraalkylureas, and mixtures thereof. The halosilicon hydrides produced by the invention may be hydrolyzed in aqueous acidic solutions to form siloxanes containing silicon-bonded hydrogen atoms which are useful in rendering fabrics waterproof.

REDUCTION OF HALOGEN-CONTAINING SILICON COMPOUNDS

This invention relates to a method of reducing halogen-containing silicon compounds. More particularly, the invention is concerned with a method of reducing a halogenosilicon compound which comprises effecting reaction between sodium hydride and a silicon compound containing from 1 to 4 silicon-bonded halogens per silicon, with any remaining valences of silicon of the silicon compound being satisfied by members selected from the class consisting of hydrogen, hydrocarbon radicals (e.g., alkyl radicals, alkenyl radicals, aryl radicals, and aralkyl radicals), and oxygen atoms, the aforesaid reaction being carried out in the presence of an aprotic solvent (which is believed to act as a catalyst) selected from the class consisting of hexaalkylphosphoramides, octaalkylpyrophosphoramides, tetraalkylureas, and mixtures thereof, where the alkyl groups of the aprotic solvent may be the same or different and may contain from 1 to 4 carbon atoms.

In the preparation of organosilicon compounds by conventional methods, it is common to pass organic halide vapors over elemental silicon or a silicon alloy to form organosilicon compounds containing silicon-bonded halogen radicals, and silicon-bonded organic radicals, as well as compounds in which the four valences of silicon are satisfied by halogen atoms. These processes of forming organosilicon compounds are particularly applicable to the formation of silanes containing both hydrocarbon radicals, e.g., methyl, and halogen atoms, and in the method used most for preparing organosilicon compounds, methyl chloride is passed over silicon in the presence of a catalyst at elevated temperatures to form mixtures of methylchlorosilanes. These methylchlorosilanes comprise methyltrichlorosilane, dimethyldichlorosilane, trimethylchlorosilane, as well as minor amounts of tetramethylsilane and silicon tetrachloride. Although these organosilicon compounds containing both organic and halogen atoms are very valuable, in many applications, such as in the formation of silicone oils, resins and elastomers, it is often desirable to obtain silicon compounds (silicon hydrides) containing hydrogen bonded directly to silicon. By the conventional processes of forming silicon halides, only a relatively small amount of compounds containing silicon-bonded hydrogen atoms are obtained.

U.S. Pat. 3,099,672 in the names of Glenn D. Cooper and Alfred R. Gilbert, issued July 30, 1963, and assigned to the same assignee as the present invention describes the reduction of halogen-containing silicon compounds by the use of sodium hydride at elevated temperatures of the order of about 175° to 350° C. Although the yield of silicon hydrides thus obtained is quite good, it is apparent that the high temperatures impose a condition which adds to the expense of making the silicon hydrides. Moreover, with the higher temperatures, additional problems of control and the presence of undesirable by-products are injected into the process.

Unexpectedly, I have discovered that I am able to carry out the reduction process described above at a much lower temperature and conveniently at room temperatures (about 20–30° C.) and below obtaining almost quantitative yields under most conditions by carrying out the reaction between the sodium hydride and the reducible silicon compound containing the silicon-bonded halogen, in the presence of the above-mentioned class of catalytic agents. It was surprising to find that the reaction proceeded in the manner described above with the reducible halogenosilane since attempts to use, for instance, a corresponding reducible alkoxysilane in place of the reducible halogenasilane under the same conditions of reduction, failed to yield any derivative products having silicon-bonded hydrogen in place of the silicon-bonded alkoxy group.

It is therefore, an object of the present invention to provide a method whereby organohalogenosilanes, silicon tetrachloride, silicon halohydrides (e.g., $SiHCl_3$, $SiH_2Cl_2$, $SiH_3Cl$, etc.) and organochlorosiloxanes may be converted to the corresponding silicon hydrides in which at least a portion of the silicon-bonded halogen atoms are replaced by silicon bonded hydrogen atoms.

This and other objects of my invention will best be understood by reference to the following description taken in connection with the appended claims.

The term "silicon hydride" as used in the present application refers to silane and siloxane compounds in which at least one hydrogen is bonded to silicon as well as compounds which contain one or more halogen, alkyl, alkenyl, aryl, or aralkyl radicals bonded to silicon in addition to silicon-bonded hydrogen.

The process of the present invention is based on my discovery that organohalogenosilanes, silicon tetrachloride, silicon chlorohydrides, and organohalogenopolysiloxanes may be partially or completely reduced to silicon hydrides by effecting reaction between the former compound and the sodium hydride at a temperture ranging from around −20° C. to room temperature and higher, usually at temperatures below those ordinarily required in the prior art, while carrying out the reaction in the presence of the aforesaid class of catalytic agents.

In addition to being able to carry out the reaction at the lower temperatures recited above, I have also found that it is possible to obtain significant amounts of partial reduction products, which is not easily accomplished by the use of other methods for hydride reduction. Thus, in the reaction of dimethyldichlorosilane with sodium hydride in the presence of hexamethylphosphoramide, I have found significant amounts of dimethylchlorosilane. In addition, the phosphoramides and ureas described above, because they have high boiling points well in excess of the lower boiling points of the formed silanes and even many of the formed siloxanes, are readily separated by a simple distallation thus permitting reuse of the phosphoramide or urea.

Silicon compounds which contain at least one silicon-bonded halogen atom with the remaining valences of the silicon being satisfied by hydrogen, oxygen, or hydrocarbon radicals will be referred to hereinafter for the sake of brevity as "reducible silicon compounds."

The reducible silicon compounds within the scope of the present invention, in addition to those mentioned previously are those corresponding to general formula (I)  $Si(X)_a(R)_{4-a}$ where X represents a hologen, e.g., chlorine, bromine, fluorine, etc., $a$ is an integer equal to from 1 to 4; and R represents members selected from the class consisting of hydrogen, alkyl radicals, e.g., methyl, ethyl, propyl, isopropyl, butyl, octyl, cyclohexyl, etc. radicals; alkenyl radicals, e.g., vinyl, allyl, methallyl, etc., radicals; aryl radicals, e.g., phenyl, tolyl, naphthyl, ethylphenyl, etc., radicals; aralkyl radicals, e.g., benzyl, phenylethyl, etc., radicals; etc.

By the process of the present invention silicon hydrides may be formed having the structure (II) $Si(H)_b(X)_n(R)_{4-(b+n)}$ where R and X have the meanings previously described, $b$ is an integer equal to from 1 to 4, inclusive, $n$ is a whole number equal to from 0 to 3, inclusive, and the sum of $b+n$ is an integer equal to from 1 to 4, inclusive.

In addition to the reducible silicon compounds described above, siloxane reducible silicon compounds may also be treated in the same manner. Among such compositions may be mentioned.

and

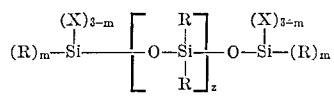

where $m$ is a whole number equal to from 0 to 2, inclusive, and $z$ is a whole number of at least 1, e.g., 1 to 100 or more and R and X have the meanings given above. In all of the above formulas, the R's and the X's may be the same or different.

Although the reducible silicon compounds which are employed as starting materials in the method of the present invention are well known in the art, reference is made to "Chemistry of the Silicones" by E. G. Rochow, 2nd edition, John Wiley & Sons, Inc. (1951), for information on the physical characteristics and method of preparation of many of these compounds. Among the specific reducible silicon compounds contemplated by the present invention may be mentioned, for example, methyltrichlorosilane, dimethyldichlorosilane, ethyl methyldichlorosilane, vinyltrichlorosilane, silicon tetrachloride, phenylmethyldichlorosilane, phenyltrichlorosilane, benzyltrichlorosilane, allyl methyldichlorosilane, methylcyclohexyldichlorosiane, 1,1 - dichlorotetramethyldisiloxane, 1,2 - dichlorotetramethyldisiloxane, hexachlorodisiloxane, tetrachlorodimethyldisiloxane, 1,5-dichlorohexamethyltrisiloxane, etc.

The sodium hydride (NaH) which is employed in the practice of the present invention is a commercially available material and is generally obtained as a dry powder or as a suspension in a suitable liquid medium. For the purposes of the present invention, the sodium hydride may be employed in any of its commercial forms or in any other form as long as the sodium hydride is not mixed with any material which is reactive under the conditions of the reaction. Thus, the sodium hydride may be employed in the reaction as a powder, or the sodium hydride may be employed as a coating on sodium chloride crystals, or the sodium hydride may be employed as a suspension in a non-reactive medium such as mineral oil, or other high boiling aliphatic hydrocarbon solvents.

Illustrative of the hexaalkylphosphoramides, the octaalkylpyrophosphoramides, and tetraalkyl ureas which may be employed in the practice of the present invention are, for example, hexamethylphosphoramide, tetramethyldibutylphosphoramide, tetramethyldipropylphosphoramide, tetramethylethlylpropylphosphoramide, tetramethyldiethylphosphoramide, octamethylpyrophosphoramide, hexamethyldibutylpyrophosphoramide, hexamethylbutylethylpyrophosphoramide, hexamethylbutylethylpyrophosphoramide, pentamethylethylphosphoramide, tetramethylurea, tetraethylurea, dimethyldiethylurea, etc.

In carrying out the process of the present invention, the only definite requirement is that the reducible silicon compound must be brought in contact with sodium hydride at a temperature which is optimum for the reaction. A procedure which is particularly useful because of the ability to use lower temperatures, involves adding the sodium hydride to a suitable reaction vessel and the reducible silicon compound is then added to the vessel in liquid or vapor form and the catalytic agent then added in the requisite amount and the reactant is allowed to react with the sodium hydride. Since the boiling points of many of the reducible silicon compounds employed in the present invention may be below the reaction temperature required in some instances, it may be desirable to provide the reaction vessel with a reflux condenser so that the unreacted material may be returned to the reaction vessel to react further with the sodium hydride and later on the condenser can in turn be used when the reaction mixture is heated to isolate the formed silicon hydride.

A still different procedure may be employed in the practice of the present invention when the sodium hydride is used in the form of a suspension in an inert liquid. In this procedure, the sodium hydride suspension is agitated in the presence of the catalytic agent while the reducible silicon compound is introduced into the bottom of the suspension. The reducible silicon compound may be introduced either in the liquid or in the vapor phase. When the compound is introduced in the vapor form, it is sometimes convenient to introduce the compound along with an inert gas such as nitrogen or hydrogen which acts as a carrier for the reducible silicon compound. In this modification the compound and the carrier gas are introduced into the stirred suspension of sodium hydride and the catalytic agent, and reaction takes place as the reducible silicon compound and carrier gas rise through the liquid suspension.

Regardless of the particular procedure employed in practicing the invention of the subject application, the products are recovered from the reaction area by condensing the products in any suitable apparatus, using low temperature (e.g., liquid nitrogen traps), where the products are too volatile. Of course, the products may also be collected as vapors in any suitable condenser.

In practicing the invention, the reaction temperature may vary from below room temperature (about $-20°$.) to 100° C. or higher, and preferably from 20 to 45° C., depending on the reducible silicon compound and the concentration of the aprotic solvent. Cooling means may be employed to control the reaction where exothermic tendencies occur. Usually atmospheric pressures are required, although subatmospheric and superatmospheric pressures are not precluded. In order to avoid possible adverse effects from the presence of oxygen (or air), the reaction is advantageously carried out in an inert atmosphere, e.g., under a blanket of nitrogen, argon, helium, etc.

Generally, the catalytic agent (which is also a solvent) employed is one which is miscible with the reducible silicon compound. However, this is not necessary since the important thing is to effect intimate reaction of the catalytic agent with the reducible silicon compound and the sodium hydride. Agitation usually accomplishes this. It should also be recognized that substantially anhydrous conditions and in inert environment should be maintained while the reducing reaction is being carried out.

In general the amount of catalytic agent employed with the reactants is not critical. For good results, I prefer to use about 0.1 to 25 parts, by weight, of the catalytic agent per part of the reducible silicon compound. Larger amounts of the agent are not precluded.

The proportions of the reactants, namely, the sodium hydride and reducible silicon compound in the practice of the present invention are not critical and may vary within wide limits. However, stoichiometric requirements call for a reaction involving one mole of sodium hydride per atom of silicon-bonded halogen for complete reduction of the reducible silicon compound. A small or a large excess of either reactant may also be employed. In situations where the reaction is being carried out in a column or the like with unreacted reducible compounds being removed from the reaction area, I can employ recirculation of unreacted material to increase the yield of silicon hydride.

By the process of the present invention, I have found it possible to replace all or only part of the silicon-bonded halogen atoms on the reducible silicon compound. However, since the reaction provides effective means of replacing all of the silicon-bonded halogens with hydrogen, the reaction is generally conducted so that the reduction is complete.

Although the method of the present invention is applicable to all types of reducible silicon compounds, I have found it particularly useful in the reduction of methylchlorosilanes to corresponding methylsilanes. These products are important since in the preparation of organosilicon compounds by the passage of methylchloride over silicon, the primary reaction products are dimethyldichlorosilane and methyltrichlorosilane. Because of the requirements of product chemistry in the silicone art, dimethyldichlorosilane is usually the most valuable product since this is the major constituent of silicone oils, gums or resins. However, there may sometimes be large amounts of methyltrichlorosilane which are not used for making the above products. By means of my process, it is possible to convert this excess methyltrichlorosilane to a highly desirable material, e.g., methyldichlorosilane, which can then be condensed with other organochlorosilanes in making organohydrogenpolysiloxanes especially useful for waterproofing fabrics.

In order that those skilled in the art may better understand how the present invention may be practiced, the following examples are given by way of illustration and not by way of limitation. All parts are by weight unless otherwise indicated.

The sodium hydride employed in the following examples was used in the form of a dispersion in mineral oil wherein the sodium hydride comprised 50 percent, by weight, of the total dispersion. In all the examples, the reaction between the reducible silicon compound and the sodium hydride was carried out under a nitrogen blanket under substantially anhydrous conditions.

EXAMPLE 1

About 2.5 grams of the sodium hydride dispersion was added to a mixture of 5 ml. phenyldimethylchlorosilane and 5 ml. hexamethylphosphoramide (HMP), and the mixture was stirred for 44 hours at room temperature (about 25–30° C.). Infrared analysis (for Si-H formation) showed that the reaction had gone to substantial completion, and that pure phenyldimethylsilane in about a 78 percent yield was isolated.

EXAMPLE 2

About 2 grams of the sodium hydride dispersion was added to a mixture of 1 ml. diethyldichlorosilane and 4 ml. HMP. After 16 hours stirring, infrared analysis showed that the reaction had gone substantially to completion. Isolation of the reaction product yielded diethylsilane [$(C_2H_5)_2SiH_2$] in about an 87 percent yield. This material was identified by its infrared spectrum and refractive index.

EXAMPLE 3

About 2 grams of the sodium hydride dispersion was added to a mixture of 2 ml. allyldimethylchlorosilane and 8 ml. HMP. The mixture was stirred for about 30 minutes at room temperature and the silane thus obtained was removed by distillation to yield a mixture of allyldimethylsilane and dimethyl-1-propenylsilane in approximately equal amounts representing a combined yield of about 70 percent.

EXAMPLE 4

Employing the same conditions and reactions as in Example 3 with the exception that 2 ml. triethylchlorosilane was substituted in place of allyldimethylchlorosilane, the mixture of ingredients was stirred for 30 minutes at room temperature to give pure triethylsilane in about a 98% yield.

EXAMPLE 5

About 4 grams of the sodium hydride dispersion was stirred with 10 ml. HMP. After 1 hour, the solution was deep blue due to dissolved sodium. The mixture was centrifuged and the blue solution decanted off, all under a nitrogen atmosphere. This extraction of sodium metal was repeated two more times to give sodium hydride substantially free of sodium metal. To this sodium hydride was added 2 ml. symmetrical tetramethyldichlorodisiloxane and 8 ml. HMP. The mixture was stirred under nitrogen for about six hours at room temperature and the reaction product distilled to give tetramethyldisiloxane [$H(CH_3)_2Si—O—Si(CH_3)_2H$] in about a 60 percent yield.

The following example illustrates the ability to use a solvent, and a catalytic amount of the HMP in my claimed process.

EXAMPLE 6

Two grams of the sodium hydride dispersion was added to 1 ml. triethylchlorosilane in 4 ml. benzene and 0.1 ml. HMP was added and the mixture stirred under nitrogen to yield triethylsilane in about a 30 percent yield after about 12 hours.

EXAMPLE 7

Employing the conditions and ingredients in Example 4 with the exception that 8 ml. pyridine was used to replace the HMP, the mixture of ingredients was stirred at room temperature for about 48 hours to give triethylsilane in about a 60 percent yield. It should be noted that the pyridine was advantageously employed as a solvent at the lower temperatures since if higher temperatures, for instance, reflux temperatures were employed, the yield of triethylsilane was significantly reduced.

EXAMPLE 8

When Example 4 was repeated employing the same conditions and reactions therein described but using the same amount of symmetrical tetramethylurea (TMU) in place of HMP, the triethylchlorosilane was reduced to triethylsilane in about 2½ hours in approximately a 70 percent yield.

EXAMPLE 9

When Example 3 was repeated as far as the condition and ingredients were concerned with the exception that 8 ml. TMU was used in place of the HMP, reduction of the allyldimethylchlorosilane to allyldimethylsilane was obtained in about 20 minutes at room temperature in approximately a 70 percent yield.

EXAMPLE 10

When Example 8 was repeated as far as ingredients and conditions were concerned, except using symmetrical tetramethyldichlorodisiloxane in place of triethylsilane, reduction to the tetramethyldisiloxane was observed to occur to the extent of 60 percent yield after 2½ hours stirring at room temperature.

EXAMPLE 11

Employing the conditions in Examples 1 and 2, but using diphenyldichlorosilane or dimethyldichlorosilane in place of the chlorosilanes recited in the foregoing two examples, it was found that the two chlorosilanes were reduced, respectively, by stirring at room temperature to diphenylsilane [$(C_6H_5)_2SiH_2$] and dimethylsilane [$(CH_3)_2SiH_2$].

EXAMPLE 12

Two ml. freshly distilled vinyldimethylchlorosilane was mixed with 2 grams of the sodium hydride dispersion and 8 ml. TMU. The mixture was stirred at room temperature for about 2½ hours after which the reaction product was distilled to produce vinyldimethylsilane in an 80 percent yield based on unrecovered starting chlorosilane.

EXAMPLE 13

About 3 grams of the sodium hydride dispersion was added to 3 ml. triethylchlorosilane and 3 ml. octamethyl pyrophosphoramide. The mixture of ingredients was stirred for 4 hours at room temperature and then distilled to produce triethylsilane in a yield of about 57 percent.

EXAMPLE 14

Two grams of the above-described dispersion of sodium hydride in mineral oil was added to a mixture of 2 ml. butyltrichlorosilane and 8 ml. of HMP at 25° C. On stirring this mixture under nitrogen, there was an immediate exothermic reaction. The mixture was stirred for about 3½ hours during which time two additional 1 gram amounts of sodium hydride dispersion were added causing an exothermic reaction after each addition. Thereafter, additional stirring and sodium hydride addition did not cause any further exothermic reaction, indicating that the reaction had gone to completion. The reaction mixture was worked up in the same manner as in the foregoing samples to give a volatile liquid identified by infra-red and by refractive index $n_D^{20}$ 1.3927 as being butylsilane in about an 82% yield.

EXAMPLE 15

When about 2 ml. of silicochloroform is added to about 4 grams of the above-described sodium hydride dispersion in mineral oil and the mixture stirred at room temperature in the presence of about 8 ml. of HMP, there is obtained a good yield of silane ($SiH_4$).

The process described above can be used also to reduce organogermanium halides. More particularly, 2 ml. triethylgermanium chloride was added to 2 grams of the above-mentioned sodium hydride dispersion in 8 ml. HMP with stirring under nitrogen at room temperature. The mixture showed an immediate exothermic reaction and after one hour stirring at room temperature, and distillation of the reaction mixture, there was obtained in approximately a 60% yield, the compound triethylgermanium hydride [$(C_2H_5)_3GeH$].

It will of course be apparent to those skilled in the art that in addition to the reducible silicon compounds described above, the process of the present invention is applicable to other reducible silicon compounds, many examples which have been given above. In addition, the conditions of reaction including the temperature, pressure, etc., can be varied widely and, particularly, it should be understood that higher temperatures may be employed without departing from the scope of the present invention. Furthermore, the sodium hydride has been described in only one liquid medium but it should be understood that the sodium hydride may be dispersed in any liquid medium which is inert under the conditions of the reaction and which has a boiling point sufficiently high so that the suspension medium is retained in the reaction system.

Obviously, many other phosphoramides, pyrophosphoramides and ureas may be employed in places of those described above. Generally, many of these agents correspond to the formulas

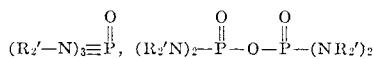

and

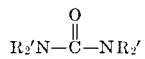

where R' is the same or different lower alkyl radicals of from 1 to 4 carbon atoms, many examples of which have been given for R above.

The various silicon hydrides prepared by the methods of the present invention are useful in numerous applications. Thus, many of these hydrides are useful as additives for high powered fuels, particularly rocket fuels. In addition, the silicon hydrides prepared by the method herein described may be hydrolyzed in an aqueous acidic (or even alkaline) solution to form siloxanes containing silicon-bonded hydrogen atoms. These siloxanes are particularly useful in rendering fabrics, waterproof. In addition, the silanes prepared by the above-described process can be reacted with olefinic materials, e.g., ethylene, propylene, vinyltriethoxysilane, etc., to form novel compositions useful in the insulating; protective and rubber foam arts. The silicon hydrides free of organic groups, e.g., $SiH_4$ or $SiHCl_3$, can be used to make free silicon by well-known techniques, which are useful in semiconductor applications.

What I claim as new and desire to secure by Letters Patent of the United States is:

1. In the process for making silicon hydrides from the reaction of sodium hydride and a reducible silicon compound containing a silicon-bonded halogen selected from the class consisting of (a) silanes of the general formula $Si(X)_a(R)_{4-a}$, (b) disiloxanes of the general formula

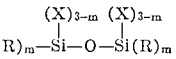

and (c) polysiloxanes of the general formula

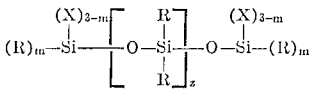

where X represents a halogen selected from the class consisting of chlorine and bromine, R is a member selected from the class consisting of hydrogen, alkyl, alkenyl, aryl, and aralkyl radicals, $a$ is an integer equal to from 1 to 4, $m$ is a whole number equal to from 0 to 2, and $z$ is a whole number of at least 1, the improvement which comprises carrying out the reaction in the presence of a member selected from the class consisting of hexaalkylphosphoramides, octaalkylpyrophosphoramides, and tetraalkylureas wherein the alkyl group contains from 1 to 4 carbon atoms.

2. The process as in claim 1 in which the phosphoramide is an hexamethylphosphoramide.

3. The process as in claim 1 in which the pyrophosphoramide is octamethylpyrophosphoramide.

4. The process as in claim 1 wherein the tetralkylurea is tetramethylurea.

5. The process as in claim 1 wherein the reducible silicon compound is an alkylchlorosilane.

6. The process as in claim 1 wherein the reducible silicon compound is a chlorosilane free of organic groups.

7. The process as in claim 1 wherein the reaction is carried out at temperatures below 100° C.

8. The process as in claim 1 wherein the reducible silicon compound is methyltrichlorosilane.

9. The process as in claim 1 wherein the reducible silicon compound is tetramethyldichlorodisiloxane.

10. The process as in claim 1 wherein the reducible silicon compound is diphenylchlorosilane.

11. The process as in claim 1 wherein the reducible silicon compound is dimethyldichlorosilane.

12. The process as in claim 1 wherein the reducible silicon compound is SiHCl$_3$.

13. The process as in claim 1 wherein the reducible silicon compound is allyldimethylchlorosilane.

References Cited

UNITED STATES PATENTS

| | | | |
|---|---|---|---|
| 3,043,857 | 7/1962 | Jenkner | 260—448.2 X |
| 3,099,671 | 7/1963 | George. | |
| 3,099,672 | 7/1963 | Cooper et al. | |
| 3,337,597 | 8/1967 | Berger. | |
| 3,362,976 | 1/1968 | Berger. | |
| 3,401,183 | 9/1968 | Berger | 260—448.2 X |
| 3,419,592 | 12/1968 | Berger. | |
| 3,439,008 | 4/1969 | Berger | 260—448.2 X |
| 3,465,019 | 9/1969 | Berger. | |

TOBIAS E. LEVOW, Primary Examiner

P. F. SHAVER, Assistant Examiner

U.S. Cl. X.R.

260—448.2